United States Patent [19]

Nakamura

[11] 3,713,413
[45] Jan. 30, 1973

[54] WATER CIRCULATING TYPE BATTERY USED IN TORPEDO OR THE LIKE

[75] Inventor: Ryoji Nakamura, Minami-ku, Kyoto-shi, Kyoto, Japan

[73] Assignee: Japan Storage Battery Co., Ltd., Kyoto, Japan

[22] Filed: May 6, 1970

[21] Appl. No.: 34,941

[30] Foreign Application Priority Data

Nov. 25, 1969 Japan..............................44/94495

[52] U.S. Cl..................................114/20 R, 136/160
[51] Int. Cl.......F42b 19/24, H01m 7/00, H01m 7/02
[58] Field of Search..........................114/20; 136/160

[56] References Cited

UNITED STATES PATENTS

| 3,012,087 | 12/1961 | Van Billard et al.................114/20 X |
| 2,932,681 | 4/1960 | Solomon.............................136/160 |
| 2,921,111 | 1/1960 | Crowley et al......................136/160 |

Primary Examiner—Samuel Feinberg
Assistant Examiner—Thomas H. Webb
Attorney—Sughrue, Rothwell, Mion, Zinn & Macpeak

[57] ABSTRACT

For continuously supplying a constant amount of acid from an acid tank to sea water or fresh water forming an electrolyte of a water circulating type battery to be used in a torpedo or the like regardless of the water pressure acting on the related parts of the battery depending on the operational depth of the torpedo or the like, an acid supplying device is driven by an electric motor energized from the water circulating type battery.

6 Claims, 3 Drawing Figures

PATENTED JAN 30 1973

3,713,413

INVENTOR
RYOJI NAKAMURA

BY Sughrue, Rothwell, Mion, Zinn & Macpeak
ATTORNEYS

WATER CIRCULATING TYPE BATTERY USED IN TORPEDO OR THE LIKE

BACKGROUND OF THE INVENTION

1. Field of the Invention

This invention relates to a water circulating type battery employed in a torpedo or the like, and more particularly to an acid supplying device for adding acid such as sulfuric acid, sulfurous acid, etc., to sea water or fresh water constituting the electrolyte of the water circulating type battery.

2. Description of the Prior Art

A water circulating type battery having sea water or fresh water circulating therethrough is well known. Such a battery employs, as an active substance of the positive electrode; silver chloride, cuprous chloride, lead chloride, etc., and as an active substance of the negative electrode: magnesium, zinc, etc. These active substances for the positive electrode and the negative electrode are deposited on one side and another of a metal foil consisting of, for instance, silver, to form an electrode unit wherein both of the substances are kept in a good electrical conductance. A plurality of such electrode units are disposed in series and laminated together with a separater of, for instance, glass beads, synthetic resin bars, or the like, interposed between each of the same. An electrolyte, the main part of which consists of sea water or fresh water, is circulated between these electrode units, so that a chemical reaction creating an electric potential is caused between the electrode unit and the electrolyte and an electric power is available from the battery.

However, the chemical reaction between magnesium or zinc of the negative electrode and the electrolyte creates hydrogen gas and an insoluble chemical product which in a given time covers the negative electrode of the battery. The internal resistance thereof is raised, thus decreasing the output capacity of the battery.

To eliminate such a disadvantageous feature of the water circulating type battery and to increase the operable capacity of the battery, an aqueous solution of sulfuric acid, prepared beforehand to a concentration of about 0.2 mol, is added to the electrolyte so that the insoluble product deposited on the negative electrode of the battery is dissolved into the electrolyte under the action of the sulfuric acid and carried out of the battery together with the electrolyte.

In this case, the concentration of the sulfuric acid contained in the sea water or fresh water must be accurately maintained at a suitable value, because the acid thus contained in the sea water or fresh water has a tendency of accelerating the wear of the negative electrode substance. Furthermore, when the battery is installed in a torpedo or the like, the water pressure applied to the inlet and outlet of the battery correspondingly varies with the depth of the torpedo in the sea. For this reason, when it is desired to add an acid to the sea water or fresh water at the inlet side of the battery, the acid must be forcedly driven into the water under a somewhat higher pressure than the above mentioned water pressure.

For this reason, if the driving pressure of the acid is preset to a value well adaptable to the deepest operational depth of the torpedo, the added amount of the acid in the electrolyte will increase excessively when the torpedo operates at a lesser depth, and not only is the consumption of the negative electrode substance accelerated but also the storage of the acid is quickly exhausted and the operational life of the battery is shortened.

SUMMARY OF THE INVENTION

Therefore, the primary object of the present invention is to provide a novel construction of a water circulating type battery employable in a torpedo or the like wherein all of the above described drawbacks of the conventional construction thereof can be substantially overcome.

Another object of the present invention is to provide a novel construction of a water circulating type battery employable in a torpedo or the like wherein a device for accurately controlling the supply of an acid to the electrolyte of the battery is provided so that not only the insoluble product on the negative electrode of the battery is removed but also the consuming action of the acid to the negative electrode substance is substantially decreased.

Still another object of the invention is to provide a novel construction of a water circulating type battery employable in a torpedo or the like wherein a device for accurately controlling the supply of an acid into the electrolyte of the battery is provided so that a constant supply of the acid can be maintained regardless of the operational water pressure of the battery.

These and other objects of the present invention can be achieved by a novel construction of a water circulating type battery wherein the device for accurately controlling the supply of an acid into the electrolyte of the battery is operated by an electric motor energized from the battery.

In another aspect of the invention, the water circulating type battery employable in a torpedo or the like is provided with a device for accurately controlling the supply of an acid from an acid storage tank into the electrolyte of the battery and the device is further provided with an acid discharging device operated under the action of an electric motor energized from the battery.

Alternatively, the water circulating type battery employable in a torpedo or the like is provided with a device for accurately controlling the supply of an acid from an acid storage tank to the electrolyte of the battery and the device is further provided with a constant delivery pump operated by an electric motor energized from the battery.

The nature, principle, and the utility of the invention will be more clearly understood from the following description with reference made to the accompanying drawings wherein like parts are designated by like reference numerals.

DETAILED DESCRIPTION OF THE INVENTION

Figure 1:
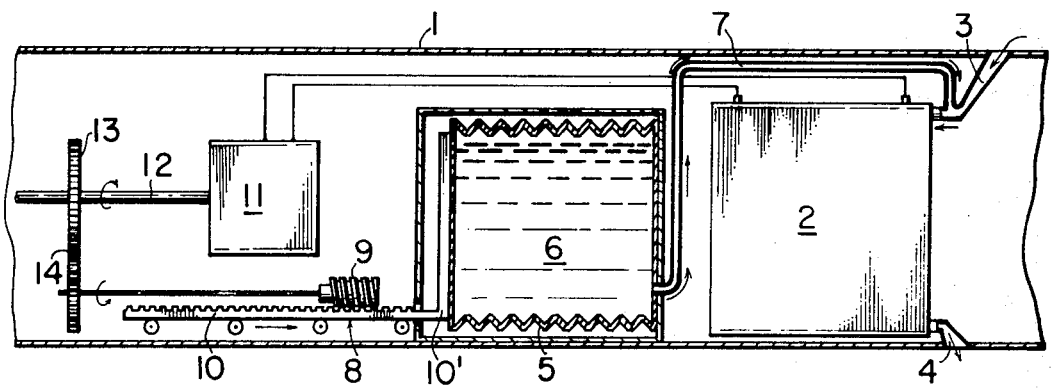
FIG. 1 is a fragmentary, sectional view showing a water circulating type battery employed in a torpedo, which constitutes an embodiment of the present invention.

Referring to FIG. 1, showing an example of water circulating battery installed in a torpedo, it is seen that the battery main body 2 is installed inside of the torpedo shell 1. The battery 2 is of a water circulating type and, for instance, silver chloride is employed as the positive electrode and magnesium is employed as the negative electrode of the battery. These active substances of the positive and negative electrodes are deposited on both sides of a silver foil so that an electrode unit is thereby formed, and a plurality of the electrode units are laminated in series. A separator such as of glass beads is interposed between each of the electrode units (the construction of the battery is not shown because it forms no part of the present invention).

Through the gaps provided between each of the electrode units, sea water or fresh water is introduced from the outside of the torpedo shell 1. To it is added, an acid supplied from an acid tank installed inside of the torpedo shell 1 and is then circulated as the electrolyte of the battery. Numeral 3 designates an electrolyte supplying tube through which the sea water or fresh water is introduced from the outside of the torpedo shell 1, and numeral 4 designates a used electrolyte exhaust tube. Numeral 5 designates an acid tank of the bellows type which is made of a flexible acid resistant and aging resistant material such as rubber. In the acid tank 5 a mineral acid 6, such as, for instance, sulfuric acid or sulfurous acid is stored. Numeral 8 designates the whole assembly of an acid discharging device which will be described hereinafter in more detail. The acid discharged by means of the device 8 passes through an acid supply tube 7 to the electrolyte supply tube 3 wherein the acid is added to the sea water or fresh water introduced from outside of the torpedo shell 1.

In the embodiment of the invention shown in FIG. 1, the discharging device 8 for the acid is composed of a worm gear 9 and a rack 10 engaging therewith and driven in a rectilinear movement. The worm gear 9 is coupled through gear wheels 13 and 14 to a propeller shaft 12 driven by an electric motor 11 which is energized by the water circulating type battery 2. When the propeller shaft 12 is driven by the electric motor 11, the worm gear 9 is rotated and the rack 10 moves in the arrowed direction. Of course, a propeller is mounted on the rear end of the propeller shaft 12 though it is not shown in the drawing.

The forward end 10' of the rack 10 defining a pusher abuts the bellows type acid tank 5, so that when the rack 10 is shifted forward, the acid tank 5 is compressed and the acid 6 inside thereof if pushed out of the tank 5 into the acid supply tube 7. The shifting speed of the rack 10 is adjusted to a suitable value for supplying a desired amount of acid to the electrolyte by determining the teeth-ratio of the gear wheels 13 and 14 and the pitch of the worm gear 9.

Figure 2:
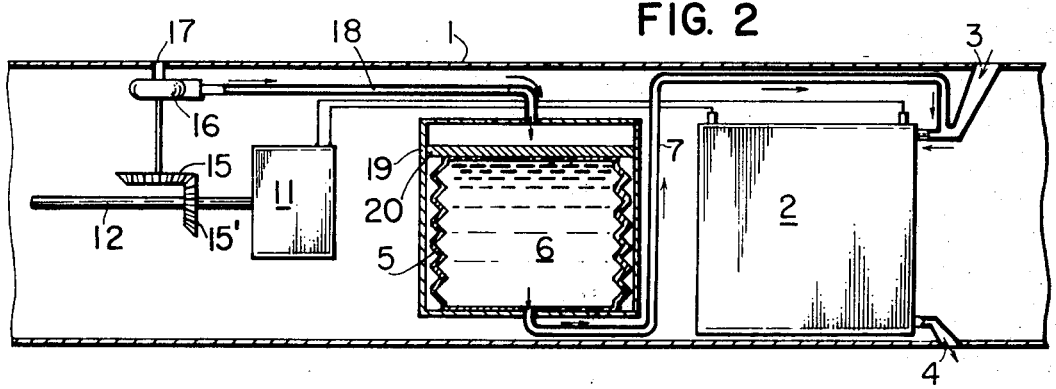
FIG. 2 is also a fragmentary sectional view showing a water circulating type battery employed in a torpedo and a constant delivery pump for use in supplying an acid to the electrolyte of the battery which constitutes another embodiment of the present invention.

According to another aspect of the present invention, which is indicated in FIG. 2, the acid in the acid tank 5 is discharged into the electrolyte of the battery by means of a constant delivery pump 16 driven directly or indirectly from an electric motor 11 operated by the circulating type battery 2. More specifically, the constant delivery pump 16 is driven through bevel gears 15 and 15', which may be driven from an electric motor 11 energized by the circulating type battery 2 or from the propeller shaft 12 of the torpedo also driven by the electric motor 11. The sea water or fresh water outside of the torpedo 1 is introduced from an inlet port 17 provided on the torpedo shell 1 to an outside casing 19 of the acid tank 5, which is in itself a bellows type, through a conduit tube 18. Under the action of the sea water or fresh water delivered into the outside casing 19, a piston 20 is shifted downwards and the acid tank 5 is compressed. As a result, a predetermined amount of the acid 6 stored in the acid tank 5 is discharged from the tank 5 and supplied to the sea water or fresh water introduced through the electrolyte supplying tube 3 to the water circulating type battery 2.

Figure 3:
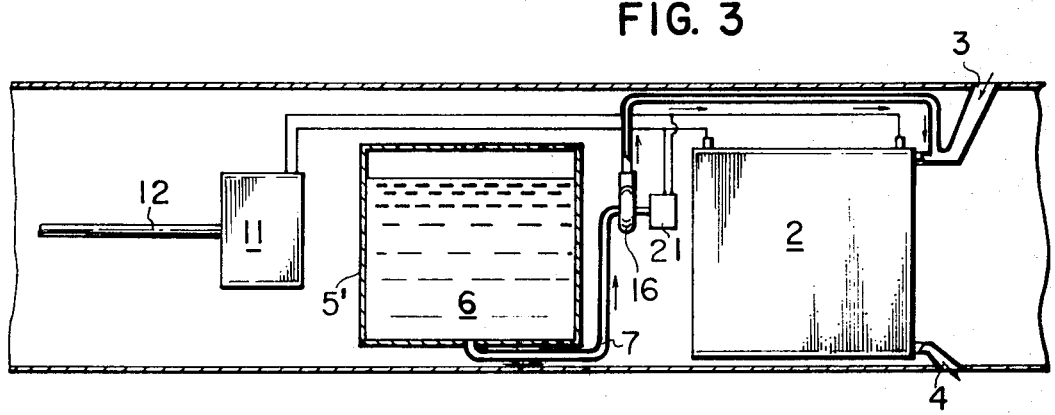
FIG. 3 is also a similar fragmentary view to that of FIGS. 1 and 2, which shows still another embodiment of the present invention.

Alternatively, the invention may also be put into practice through a still modified manner as illustrated in FIG. 3. In this embodiment, the constant delivery pump 16 is located between the acid tank 5' and the battery 2, and the pump 16 is driven by a separately provided electric motor 21 also energized from the water circulating type battery 2. It is apparent that the pump 16 may also be driven from a propeller shaft 12 of the torpedo through an interlinking means (not shown). In either case, a constant amount of the acid can be supplied from the acid tank 5' to the electrolyte of the battery 2.

As described above, at the time the sea water or fresh water outside of the torpedo is introduced into the water circulating type battery employed as the power source of the torpedo, according to the present invention, a constant amount of acid is supplied into the electrolyte of the battery independent of the water pressure acting on the battery and on the acid tank in accordance with the operating depth of the torpedo, whereby the battery can be operated in an ideal condition with the concentration of the acid being maintained at a constant value.

What is claimed is:

1. In a torpedo employing a water circulating battery including a water inlet conduit leading to said battery and a water outlet conduit leading therefrom, the improvement comprising:
    an acid tank carried by the torpedo,
    means fluid coupling said tank to said water inlet conduit in adjacency to the battery,
    driven means for introducing acid from said tank to said battery for controlling electrolyte circulation therethrough, and
    drive means for driving said driven means.

2. The torpedo as defined in claim 1, wherein said acid tank includes a movable wall permitting acid to be forced therefrom and said driven means comprises a mechanically movable pusher coupled to said movable wall for compressibly reducing the volume of said tank and wherein said drive means comprises an electric motor operatively coupled to said pusher.

3. A torpedo as defined in claim 2, further comprising a propeller shaft and wherein an electric motor drives said propeller shaft and said pusher is operatively coupled to said propeller shaft.

4. A torpedo as defined in claim 1, further comprising a propeller shaft carried by said torpedo and wherein; said acid tank is of the bellows type formed with walls of flexible material spanned by a rigid wall, and said driven means comprises a rack abutting said rigid wall and shiftable in a linear manner to compress one end of the tank.

5. A torpedo as defined in claim 1, wherein said driven means comprises a pump fluid coupling an orifice within the wall of said torpedo and said tank, said tank includes an internal movable wall separating the acid on one side from water delivered by said pump on the other side, said wall moves in response to water pressure thus introduced by said pump for pushing the acid stored in the acid tank from the same to control the electrolyte circulating through said battery.

6. The torpedo as defined in claim 5, further comprising a propeller shaft and wherein said drive means comprises means coupling said pump to said propeller shaft, and means coupling said motor to said propeller shaft for driving both said pump and said propeller shaft.

* * * * *